(12) United States Patent
Daniello

(10) Patent No.: US 9,932,234 B2
(45) Date of Patent: Apr. 3, 2018

(54) MEMBRANE-BASED AIR SEPARATION MODULE

(71) Applicant: Hamilton Sundstrand Corporation, Windsor Locks, CT (US)

(72) Inventor: Robert Daniello, Florence, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 226 days.

(21) Appl. No.: 14/797,935

(22) Filed: Jul. 13, 2015

(65) Prior Publication Data

US 2017/0015557 A1 Jan. 19, 2017

(51) Int. Cl.
*C01B 21/04* (2006.01)
*B01D 53/22* (2006.01)
(Continued)

(52) U.S. Cl.
CPC ........ *C01B 21/0444* (2013.01); *B01D 53/226* (2013.01); *B01D 53/268* (2013.01); *B01D 63/04* (2013.01); *B01D 65/08* (2013.01); *B64D 37/32* (2013.01); *B64D 45/00* (2013.01); *B01D 53/228* (2013.01); *B01D 71/64* (2013.01);
(Continued)

(58) Field of Classification Search
CPC .......... C01B 21/0444; B64D 2045/009; B64D 45/00; B64D 37/32; B01D 2257/104; B01D 71/68; B01D 53/228; B01D 65/08; B01D 63/04; B01D 2256/10; B01D 53/268; B01D 2259/4575; B01D 71/64; B01D 53/226; B01D 2257/80; B01D 2313/083; B01D 53/22; B01D 2053/224
See application file for complete search history.

(56) References Cited

U.S. PATENT DOCUMENTS 4,439,213 A * 3/1984 Frey ..................... B01D 53/047
  95/122
4,783,201 A * 11/1988 Rice ....................... B01D 53/22
  95/52

(Continued)

FOREIGN PATENT DOCUMENTS

EP 0390392 A2 10/1990

OTHER PUBLICATIONS

Extended European Search Report for EP Application No. 16179090.0, dated Nov. 23, 2016, 6 pages.

*Primary Examiner* — Anthony R Shumate
(74) *Attorney, Agent, or Firm* — Kinney & Lange, P.A.

(57) ABSTRACT

A membrane-based air separation module includes an inlet configured to receive supply air, a first hollow fiber membrane configured to substantially remove water from the supply air to form an anhydrous air stream, and a permeate port configured to exhaust the water removed by the first hollow fiber membrane from the air separation module. The air separation module also includes a second hollow fiber membrane positioned downstream of the first hollow fiber membrane configured to receive the anhydrous air stream and substantially remove oxygen from the anhydrous air stream, an oxygen-enriched air outlet configured to exhaust the oxygen removed by the second hollow fiber membrane from the air separation module, and a nitrogen-enriched air outlet configured to supply a stream of nitrogen-enriched air to a fuel tank of an aircraft.

18 Claims, 5 Drawing Sheets

(51) Int. Cl.
   B64D 37/32 (2006.01)
   B64D 45/00 (2006.01)
   B01D 53/26 (2006.01)
   B01D 63/04 (2006.01)
   B01D 65/08 (2006.01)
   B01D 71/64 (2006.01)
   B01D 71/68 (2006.01)

(52) U.S. Cl.
   CPC ........ *B01D 71/68* (2013.01); *B01D 2053/224* (2013.01); *B01D 2256/10* (2013.01); *B01D 2257/104* (2013.01); *B01D 2259/4575* (2013.01); *B01D 2313/083* (2013.01); *B64D 2045/009* (2013.01)

(56) References Cited

U.S. PATENT DOCUMENTS

| | | | |
|---|---|---|---|
| 5,837,032 A * | 11/1998 | Moll | B01D 53/22 95/45 |
| 6,004,383 A * | 12/1999 | Kuhnelt | B01D 53/268 95/52 |
| 6,471,749 B1 * | 10/2002 | Kawai | B01D 53/0462 95/106 |
| 6,913,636 B2 | 7/2005 | Defrancesco et al. | |
| 8,245,978 B1 | 8/2012 | Beers et al. | |
| 8,500,878 B2 | 8/2013 | Cremers et al. | |
| 8,882,886 B2 | 11/2014 | Evosevich et al. | |
| 9,616,388 B2 * | 4/2017 | Pimentel | B01D 61/12 |
| 2002/0139245 A1* | 10/2002 | Kesten | B01D 53/22 95/52 |
| 2005/0092177 A1* | 5/2005 | Bonchonsky | B01D 53/0454 95/138 |
| 2005/0115404 A1* | 6/2005 | Leigh | B01D 53/0454 95/11 |
| 2006/0230935 A1* | 10/2006 | Michael | B01D 53/0476 95/273 |
| 2008/0060517 A1* | 3/2008 | Nichols | B01D 53/22 95/45 |
| 2008/0210240 A1* | 9/2008 | Kotliar | A62C 99/0018 128/205.26 |
| 2012/0067205 A1* | 3/2012 | Pendzich | B01D 53/002 95/17 |
| 2012/0305459 A1* | 12/2012 | Takabatake | B01D 61/022 210/97 |
| 2012/0312162 A1* | 12/2012 | Theodore | B01D 63/022 95/47 |
| 2013/0042755 A1 | 2/2013 | Majumdar et al. | |
| 2014/0360365 A1* | 12/2014 | Wynn | B01D 53/22 95/45 |
| 2015/0000523 A1 | 1/2015 | Jojic et al. | |
| 2015/0122814 A1* | 5/2015 | Tichborne | B64D 37/32 220/88.3 |
| 2015/0165370 A1* | 6/2015 | Peake | B01D 53/229 96/7 |

\* cited by examiner

US 9,932,234 B2

MEMBRANE-BASED AIR SEPARATION MODULE

BACKGROUND

The present disclosure relates generally to aircraft safety, and, more particularly, to aircraft fuel tank inerting. Specifically, the present disclosure concerns membrane-based air separation modules (ASMs).

As an aircraft consumes fuel during flight, atmospheric air consisting largely of nitrogen and oxygen enters its fuel tanks. The presence of atmospheric air in the fuel tanks increases the risk of combustion as oxygen mixes with fuel vapors. In order to prevent combustion, the void left by fuel consumption is filled with an inert gas, such as nitrogen. A nitrogen generation system (NGS) includes an ASM, which produces nitrogen-enriched air (NEA) for inerting the fuel tanks. Ideally, the concentration of oxygen in the fuel tanks is less than twelve percent. The presence of NEA substantially reduces the risk of combustion.

A membrane-based ASM includes a polymeric membrane for separating atmospheric air into NEA and oxygen-enriched air (OEA). Polyimide is commonly used to form the tubular membranes within a membrane-based ASM canister. Polyimide is advantageous, in large part, due to its ozone resistance while the aircraft is in flight. However, polyimide is particularly susceptible to damage from exposure to nitrogen oxide ($NO_x$) and sulfur oxide ($SO_x$) from engine exhaust during ground operations. In the presence of water, these acidic gases cause deterioration, necessitating membrane replacement.

SUMMARY

In one embodiment, a membrane-based air separation module includes an inlet configured to receive supply air, a first hollow fiber membrane configured to substantially remove water from the supply air to form an anhydrous air stream, and a permeate port configured to exhaust the water removed by the first hollow fiber membrane from the air separation module. The air separation module also includes a second hollow fiber membrane positioned downstream of the first hollow fiber membrane configured to receive the anhydrous air stream and substantially remove oxygen from the anhydrous air stream, an oxygen-enriched air outlet configured to exhaust the oxygen removed by the second hollow fiber membrane from the air separation module, and a nitrogen-enriched air outlet configured to supply a stream of nitrogen-enriched air to a fuel tank of an aircraft.

In another embodiment, a method of generating nitrogen-enriched air includes providing supply air to an inlet of a membrane-based air separation module, flowing the supply air through a first hollow fiber membrane to substantially remove water from the supply air, and exhausting water removed by the first hollow fiber membrane from the air separation module. The method also includes flowing the supply air through a second hollow fiber membrane to substantially remove oxygen from the supply air, exhausting oxygen removed by the second hollow fiber membrane from the air separation module, and supplying a stream of nitrogen-enriched air produced by the air separation module to a fuel tank of an aircraft.

DETAILED DESCRIPTION

The present disclosure relates to a membrane-based air separation module for generating nitrogen-enriched air (NEA). The membrane-based air separation module includes a first membrane that can be formed from a material that is less susceptible to acid gas damage, and a second membrane that can be formed from a material that is less susceptible to reactions with ozone. By directing supply air through the first membrane during ground operation and the second membrane during flight, the life or one of both membranes can be extended. The membrane-based air separation module of the present disclosure improves robustness of membrane materials. While the present disclosure is described in the context of aircraft fuel tank inerting, it is to be understood that the following embodiments could be employed in any environment requiring a more robust air separation system.

Figure 1:
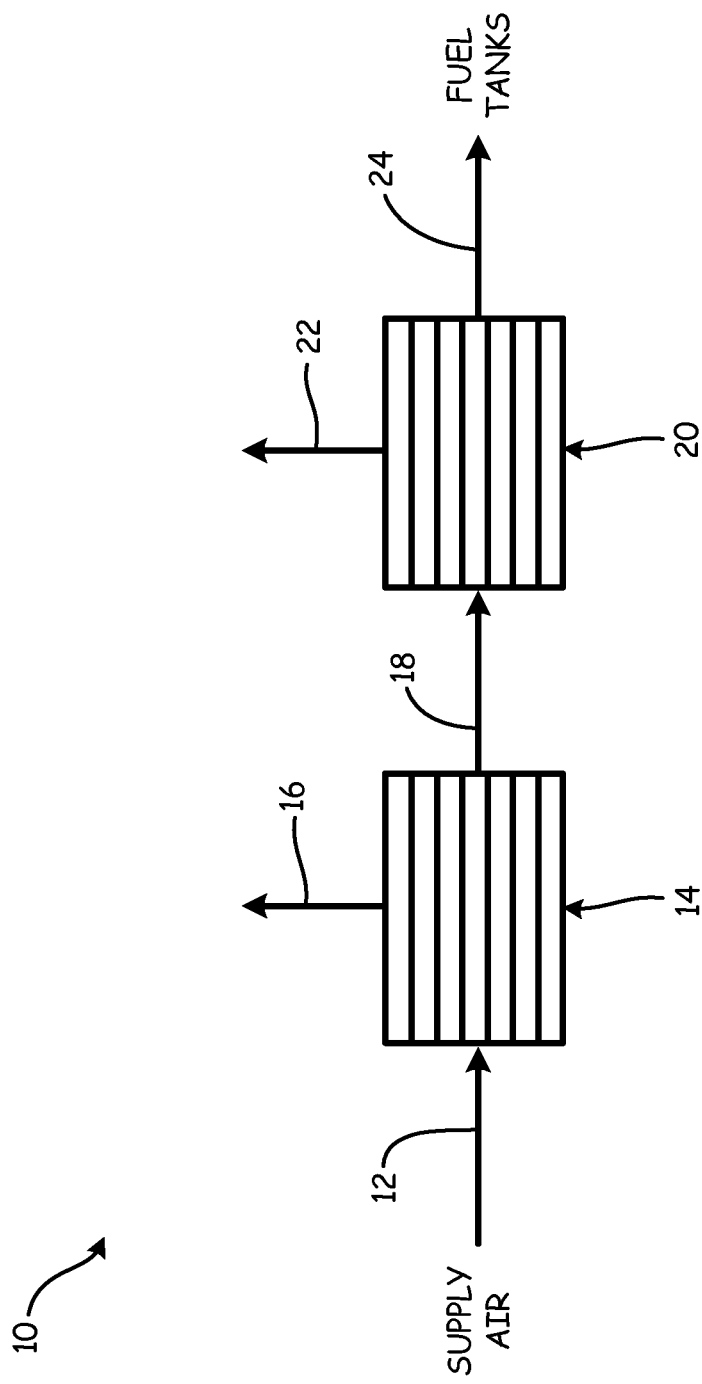
FIG. 1 is a schematic view of a membrane-based air separation module.

FIG. 1 is a schematic view of membrane-based air separation module (ASM) 10. ASM 10 includes supply air input 12, first membrane 14, permeate output 16, anhydrous air line 18, second membrane 20, oxygen-enriched air (OEA) output 22, and NEA output 24.

ASM 10 receives supply air through supply air input 12. Supply air is delivered to first membrane 14, where water is substantially removed and exhausted from ASM 10 via permeate output 16, as discussed in greater detail below. The removal of water by first membrane 14 generates anhydrous air. Anhydrous air line 18 delivers anhydrous air to second membrane 20. Second membrane 20 substantially removes oxygen from the anhydrous air, generating an OEA stream and a NEA stream. OEA is exhausted from ASM 10 via OEA output 22, and the NEA is delivered via NEA output 24 to a fuel tank or other container of an aircraft that requires inerting. The concentration of oxygen in the NEA exiting ASM 10 is generally between about 5% and about 12%.

Supply air flowing through supply air input 12 is typically bleed air from a compressor section of a gas turbine engine (not shown). Bled air exiting the compressor section is at a temperature ranging from about 100° F. (37° C.) to 450° F. (232° C.). In some embodiments, bleed air is cooled by a heat exchanger (not shown) prior to delivery to ASM 10. Temperature-conditioned supply air exiting the heat exchanger is at a temperature ranging from about 60° F. (15° C.) to 200° F. (93° C.). The temperature-conditioned supply air is then delivered to ASM 10 via supply air input 12.

Bleed air is typically atmospheric air. Atmospheric air is composed of about 78 percent nitrogen and 21 percent oxygen, with trace amounts of other gases. ASM 10 includes at least two hollow fiber membranes, namely first membrane 14 and second membrane 20 in the embodiment shown in FIG. 1. These hollow fiber membranes are permeable to oxygen and water. The partial pressure of oxygen inside the canister (shown and described in FIGS. 4A and 4B) is less than the partial pressure of oxygen inside hollow fiber membranes 18. As a result, oxygen permeates across the hollow fiber membranes of first membrane 14 and second membrane 20 and exits ASM 10 through permeate output 16 and OEA output 22, respectively. The hollow fiber membranes of ASM 10 are typically more permeable to water than oxygen. In the embodiment of FIG. 1, water diffuses across the hollow fiber membranes of first membrane 14 and exits ASM 10 through permeate output 16 along with oxygen.

The hollow fiber membranes of ASM 10 are typically formed from a polymer such as poly(1-trimethylsilyl-1-propyne), Teflon® (polytetrafluoroethylene), silicone rubber, poly(4-methyl-1-pentene), poly(phenylene oxide), ethyl cellulose, polyimide, polysulfone, polyaramide, tetrabromo bis polycarbonate, or combinations thereof. Polyimides are commonly used for efficiency and resistance to ozone degradation while the aircraft is in flight. However, during ground operation, acid gases such as nitrogen oxide ($NO_x$) and sulfur oxide ($SO_x$) can enter ASM 10 from engine exhaust. In the presence of water during damp or humid conditions, these acid gases damage polyimide hollow fiber membranes. Other polymer materials, such as polysulfone, are less susceptible to $SO_x/NO_x$ damage, but more susceptible to reactions with ozone, causing the double bonds within the polymer to break.

In the embodiment shown in FIG. 1, first membrane 14 includes polysulfone hollow fiber membranes and second membrane 20 is composed of polyimide hollow fiber membranes. In other embodiments, first membrane 14 can include any polymer, including polyimide, and can be removable and replaceable such that first membrane 14 acts as a "sacrificial" membrane. In this manner, second membrane 20 is protected from harmful $SO_x/NO_x$ damage, which prolongs the overall longevity and inerting capabilities of ASM 10.

Figure 2:
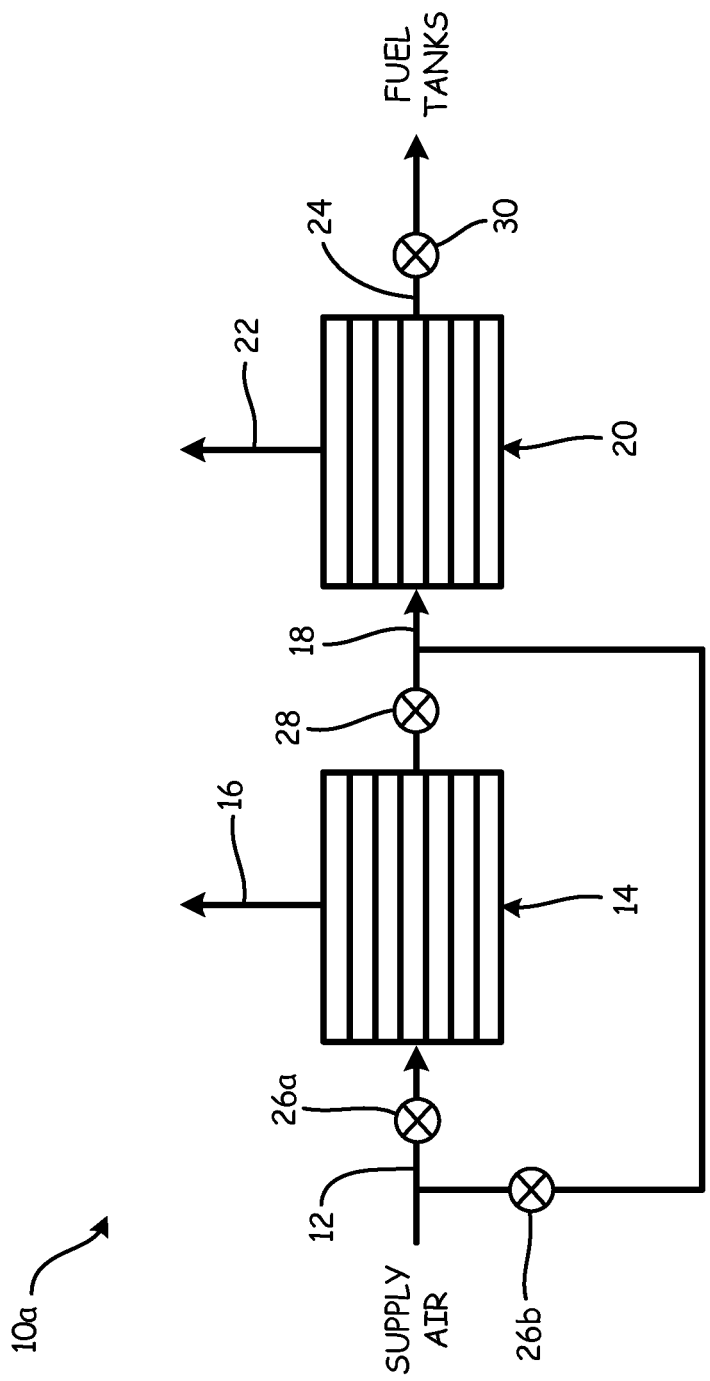
FIG. 2 is a schematic view of a membrane-based air separation module including flow control valves for diverting supply air during flight.

FIG. 2 is a schematic view of ASM 10a including flow control valves for diverting supply air during flight. In addition to those elements listed with respect to ASM 10, ASM 10a includes supply air control valves 26a and 26b, anhydrous air control valve 28, and NEA control valve 30.

As in FIG. 1, supply air enters ASM 10a via supply air input 12. In the embodiment shown in FIG. 2, supply air control valves 26a and 26b are positioned upstream from first membrane 14 to direct supply air entering supply air input 12. Anhydrous air control valve 28 is positioned between first membrane 14 and second membrane 20 to control flow between first membrane 14 and second membrane 20. NEA control valve 30 is located between second membrane 20 and a fuel tank or container requiring NEA to control flow of NEA between second membrane 20 and the fuel tank or container. This system of flow control valves can be used to divert the flow path of supply air through ASM 10a to improve the longevity of both first membrane 14 and second membrane 20. In other embodiments, additional valves can be present to direct flow and prevent backflow.

For example, in the embodiment shown in FIG. 2, first membrane 14 is composed of polysulfone hollow fiber membranes and second membrane 20 is composed of polyimide hollow fiber membranes. During ground operations, supply air control valve 26a is open and supply air control valve 26b is closed to direct supply air flow to first membrane 14. First membrane 14 removes water from the supply air stream to generate anhydrous air, and anhydrous air control valve 28 is open to allow anhydrous air to flow along anhydrous air line 18 to second membrane 14. Without the presence of water, $SO_x$ and $NO_x$ gases from engine exhaust pass through second membrane 20 without causing damage.

During flight, supply air control valve 26a and anhydrous air control valve 28 are closed, and supply air control valve 26b is open such that supply air is diverted around first membrane 14 directly to second membrane 20. In this manner, the polysulfone hollow fiber membranes of first membrane 14 can protect the $SO_x/NO_x$-sensitive hollow fiber membranes of second membrane 20 during ground operations, while supply air is directed around first membrane 14 during flight when protection from $SO_x/NO_x$ is not needed. Conversely, the ozone-sensitive hollow fiber membranes of first membrane 14 are protected while the aircraft is in flight when the supply air is diverted directly to second membrane 20, as shown and described in greater detail in FIG. 3.

Figure 3:
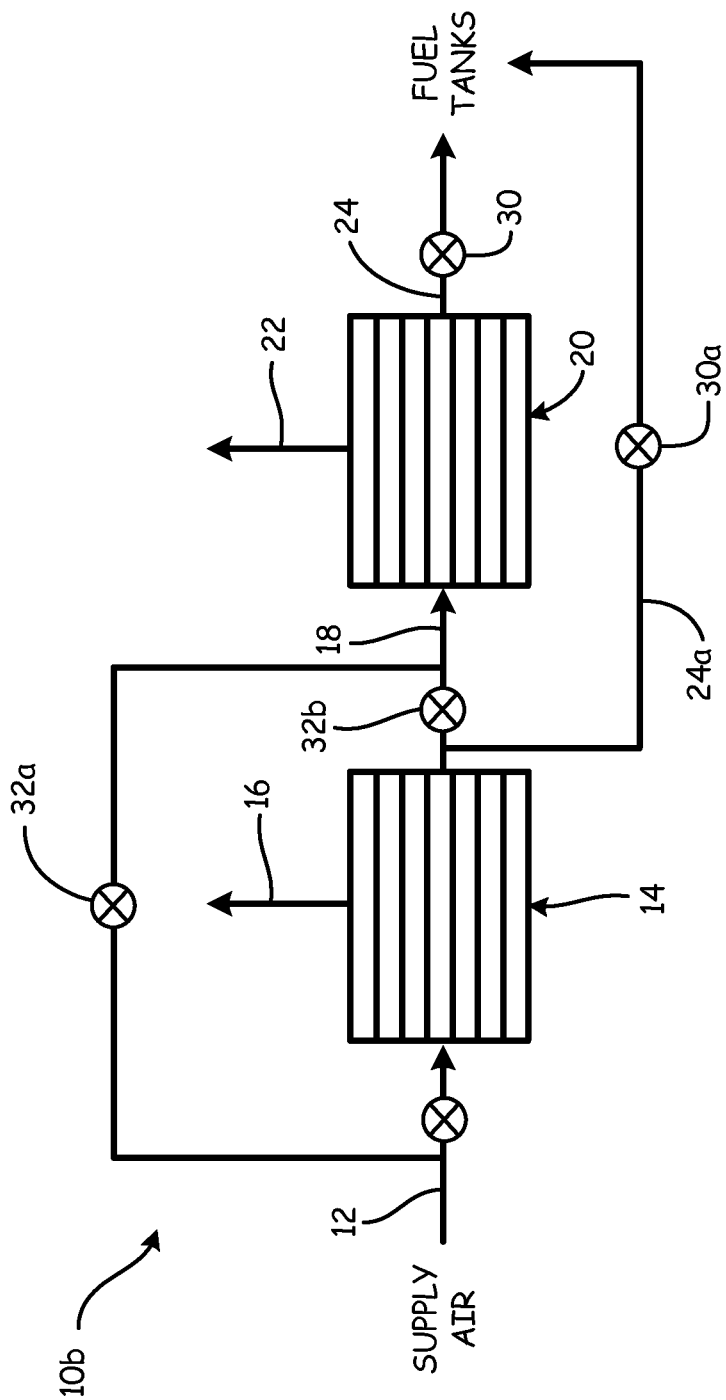
FIG. 3 is a schematic view of a membrane-based air separation module including flow control valves for diverting supply air when the demand for nitrogen-enriched air is high.

FIG. 3 is a schematic view of ASM 10b including flow control valves for diverting supply air when the demand for nitrogen-enriched air is high. In addition to those elements listed with respect to ASM 10, ASM 10b includes NEA control valve 30a.

As in FIG. 1 and FIG. 2, supply air enters ASM 10b via supply air input 12. In the embodiment of FIG. 3, supply air separator valve 32a is positioned between supply air input 12 and second membrane 20. Supply air separator valve 32b is positioned between first membrane 14 and second membrane 20. NEA control valve 30a is positioned along NEA output 24a between first membrane 14 and the fuel tank or container requiring NEA. This system of flow control valves can be used to divert the flow path of supply air through first membrane 14 and second membrane 20 in parallel when the demand for NEA is high.

ASM 10b generates NEA with varying flow rate and oxygen concentration based on demand during an aircraft's flight profile. During the ascent and cruise portions of the flight profile, a lower amount of NEA is required. The most NEA is required during the descent portion of the flight profile. In the embodiment shown in FIG. 3, supply air separator valve 32a is open and supply air separator valve 32b is closed such that supply air flows directly to first membrane 14 and second membrane 20. First membrane 14 and second membrane 20 remove oxygen from ASM 10b and generate two NEA outputs (24 and 24a). Both NEA control valve 30 and 30a are open to deliver NEA to the fuel tank or container requiring NEA. In this manner, two separate streams of NEA are generated and delivered to the fuel tank or container when NEA demand is highest during the descent portion of the flight profile.

Figure 4A:
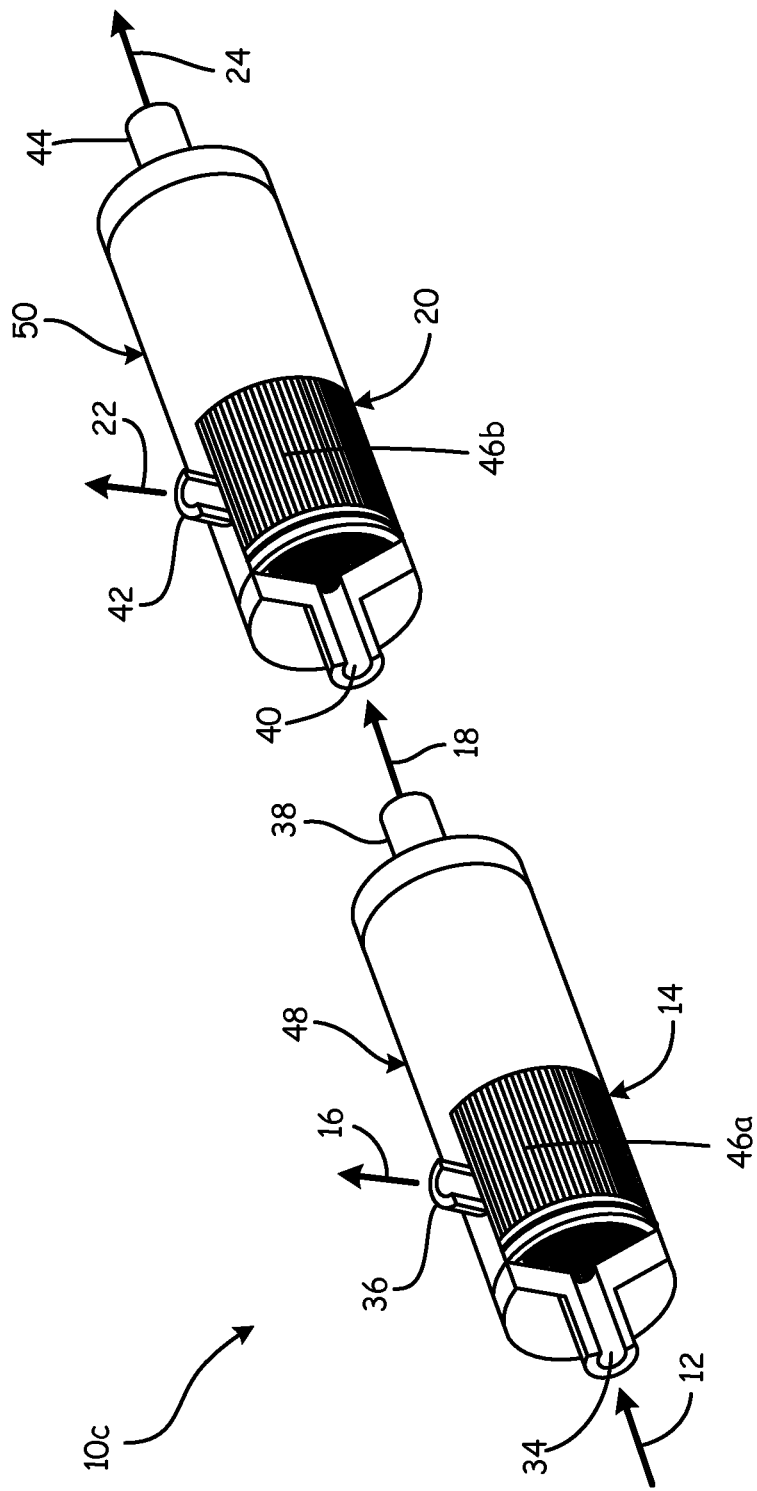
FIG. 4A is a partial cutaway perspective view of hollow fiber membranes housed in two separate canisters.
Figure 4B:
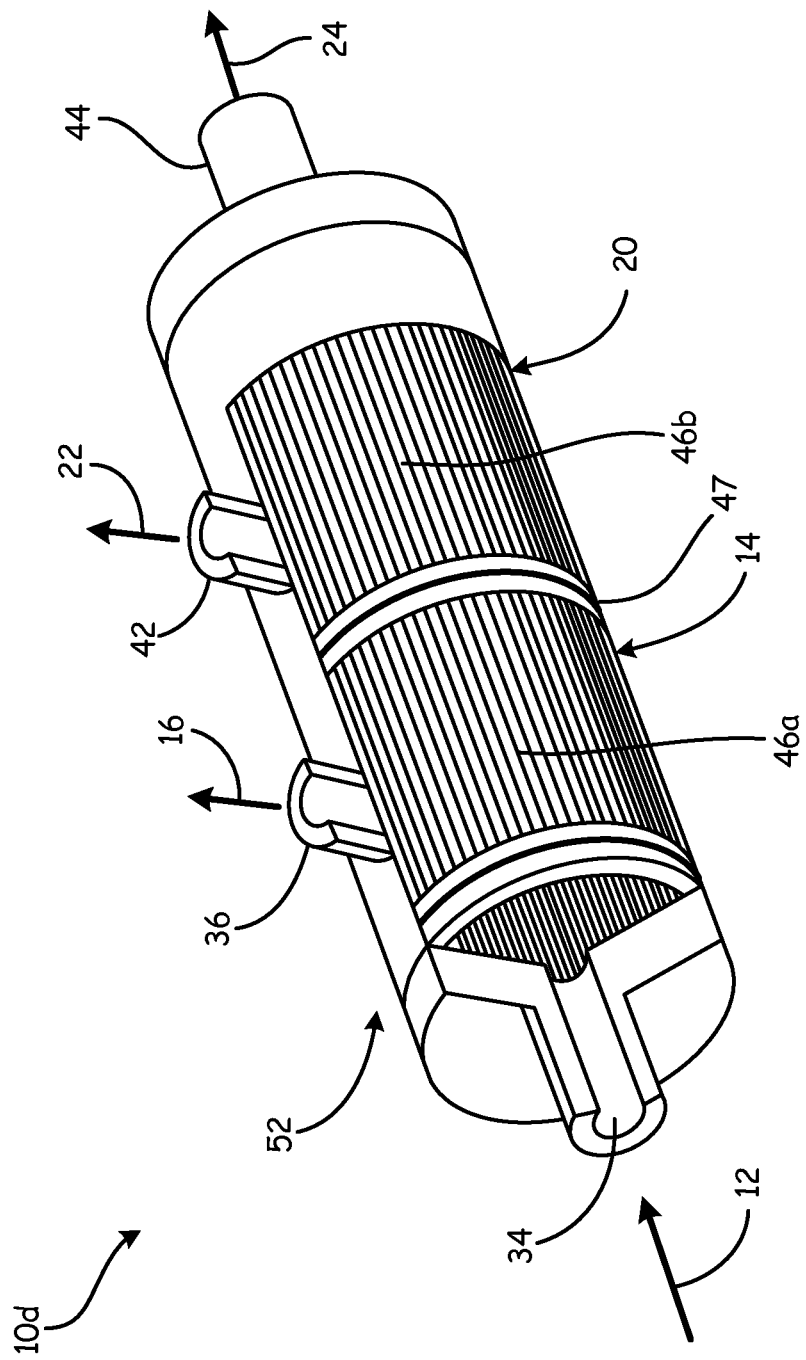
FIG. 4B is a partial cutaway perspective view of hollow fiber membranes housed in a single canister.

FIG. 4A and FIG. 4B are partial cutaway perspective views of first membrane 14 and second membrane 20 of ASM 10c and ASM 10d. In FIG. 4A, first membrane 14 and second membrane 20 are housed in two separate canisters. In FIG. 4B, first membrane 14 and second membrane 20 are housed in a single canister.

In the embodiment shown in FIG. 4A, ASM 10c includes supply air input 12, first membrane 14, permeate output 16, anhydrous air line 18, second membrane 20, OEA output 22, NEA output 24, supply air inlet 34, permeate port 36, anhydrous air outlet 38, anhydrous air inlet 40, OEA outlet 42, NEA outlet 44, hollow fiber membranes 46a and 46b, first canister 48, and second canister 50.

In the embodiment shown in FIG. 4A, supply air input 12 enters supply air inlet 34 of first canister 48. Supply air passes through hollow fiber membranes 46a, where water and oxygen permeate into first canister 48 and are exhausted through permeate output 16 via permeate port 36. Anhydrous air exits first canister 48 through anhydrous air outlet 38. Anhydrous air enters second canister 50 via anhydrous air inlet 40. Anhydrous air passes through hollow fiber membranes 46b, where oxygen permeates into second canister 50 and is exhausted through OEA output 22 via OEA outlet 42. NEA exits second canister 50 through NEA output 24 via NEA outlet 44 and travels to the fuel tank or canister requiring NEA.

In the embodiment of FIG. 4B, ASM 10d includes supply air input 12, first membrane 14, permeate output 16, second membrane 20, OEA output 22, NEA output 24, supply air inlet 34, permeate port 36, OEA outlet 42, NEA outlet 44, hollow fiber membranes 46a and 46b, connection 47, and canister 52.

In the embodiment shown in FIG. 4B, supply air input 12 enters supply air inlet 34 of canister 52. First membrane 14 and second membrane 20 can be housed end-to-end in canister 52, forming connection 47. The ends of first membrane 14 and second membrane 20 can seal up to the inside surface of canister 52. Supply air passes through hollow fiber membranes 46a, where water and oxygen permeate into canister 52 and are exhausted in permeate output 16 via permeate port 36. Anhydrous air passes directly to second membrane 20, where oxygen permeates through hollow membrane fibers 46b into canister 52 and is exhausted in OEA output 22 through OEA outlet 42. NEA exits canister 52 in NEA output 24 via NEA outlet 44 and travels to the fuel tank or canister requiring NEA.

In this manner, first membrane 14 and second membrane 20 can be housed separately or in the same canister. First canister 48 can be changed at a more frequent interval than second canister 50 to preserve the NEA output of second membrane 20. In the embodiment of FIG. 4B, first membrane 14 can be removable and replaceable to preserve the longevity of second membrane 20. Further, flow control (as shown and discussed in FIG. 2) can extend the life of both first membrane 14 and second membrane 20. For example, if hollow fiber membranes 46a are composed of polysulfone (about 4,000-8,000-hour life) and hollow fiber membranes 46b are composed of polyimide (about 20,000-30,000-hour life), and first membrane 14 is operated on the ground while second membrane 20 is operated during flight, the longevity of each membrane can be extended.

Discussion of Possible Embodiments

The following are non-exclusive descriptions of possible embodiments of the present invention.

A membrane-based air separation module according to an exemplary embodiment of this disclosure, among other possible things, can include an inlet configured to receive supply air, a first hollow fiber membrane configured to substantially remove water from the supply air to form an anhydrous air stream, and a permeate port configured to exhaust the water removed by the first hollow fiber membrane from the air separation module. The air separation module can also include a second hollow fiber membrane positioned downstream of the first hollow fiber membrane configured to receive the anhydrous air stream and substantially remove oxygen from the anhydrous air stream, an oxygen-enriched air outlet configured to exhaust the oxygen removed by the second hollow fiber membrane from the air separation module, and a nitrogen-enriched air outlet configured to supply a stream of nitrogen-enriched air to a fuel tank of an aircraft.

The membrane-based air separation module of the preceding paragraph can optionally include, additionally and/or alternatively, any one or more of the following features, configurations and/or additional components:

A further embodiment of the foregoing membrane-based air separation module can include that the supply air is bleed air.

A further embodiment of any of the foregoing membrane-based air separation modules can include that the first hollow fiber membrane is removable from the air separation module.

A further embodiment of any of the foregoing membrane-based air separation modules can include that the first hollow fiber membrane comprises a first membrane material and the second hollow fiber membrane comprises a second membrane material different from the first membrane material.

A further embodiment of any of the foregoing membrane-based air separation modules can include that the first membrane material comprises polysulfone and the second membrane material comprises polyimide.

A further embodiment of any of the foregoing membrane-based air separation modules can include that the first hollow fiber membrane and the second hollow fiber membrane comprise a single type of membrane material.

A further embodiment of any of the foregoing membrane-based air separation modules can include that the single type of membrane material comprises polyimide.

A further embodiment of any of the foregoing membrane-based air separation modules can include a series of flow control valves positioned between the inlet and the first hollow fiber membrane and between the first hollow fiber membrane and the second hollow fiber membrane to divert supply air directly to the second hollow fiber membrane while the aircraft is in flight.

A further embodiment of any of the foregoing membrane-based air separation modules can include a plurality of flow lines configured to direct supply air through the first hollow fiber membrane and the second hollow fiber membrane in parallel when demand for nitrogen-enriched air is high.

A further embodiment of any of the foregoing membrane-based air separation modules can include that the first hollow fiber membrane is housed in a first canister and the second hollow fiber membrane is housed in a second canister.

A further embodiment of any of the foregoing membrane-based air separation modules can include that the first hollow fiber membrane and the second hollow fiber membrane are housed in a single canister.

A further embodiment of any of the foregoing membrane-based air separation modules can include a flow control valve disposed between the first and second hollow fiber membranes and the fuel tank.

A method of generating nitrogen-enriched air can include providing supply air to an inlet of a membrane-based air separation module, flowing the supply air through a first hollow fiber membrane to substantially remove water from the supply air, and exhausting water removed by the first hollow fiber membrane from the air separation module. The method can also include flowing the supply air through a second hollow fiber membrane to substantially remove oxygen from the supply air, exhausting oxygen removed by the second hollow fiber membrane from the air separation module, and supplying a stream of nitrogen-enriched air produced by the air separation module to a fuel tank of an aircraft.

The method of the preceding paragraph can optionally include, additionally and/or alternatively, any one or more of the following features, configurations and/or additional components:

A further embodiment of the foregoing method can include cooling bleed air to condition the supply air.

A further embodiment of any of the foregoing methods can include diverting supply air directly to the second hollow fiber membrane while the aircraft is in flight.

A further embodiment of any of the foregoing methods can include directing supply air through the first hollow fiber membrane and the second hollow fiber membrane in parallel when demand for nitrogen-enriched air is high.

A further embodiment of any of the foregoing methods can include that the first hollow fiber membrane comprises a first membrane material and the second hollow fiber membrane comprises a second membrane material different from the first membrane material.

A further embodiment of any of the foregoing methods can include that the first hollow fiber membrane and the second hollow fiber membrane comprise a single type of membrane material.

A further embodiment of any of the foregoing methods can include housing the first hollow fiber membrane in a first canister and the second hollow fiber membrane in a second canister.

A further embodiment of any of the foregoing methods can include housing the first hollow fiber membrane and the second hollow fiber membrane in a single canister.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed, but that the disclosure will include all embodiments falling within the scope of the appended claims.

The invention claimed is:

1. A membrane-based air separation module comprising:
    an inlet configured to receive supply air;
    a first hollow fiber membrane configured to substantially remove water from the supply air to form an anhydrous air stream;
    a permeate port configured to exhaust the water removed by the first hollow fiber membrane from the air separation module;
    a second hollow fiber membrane positioned downstream of the first hollow fiber membrane configured to receive the anhydrous air stream and substantially remove oxygen from the anhydrous air stream;
    an oxygen-enriched air outlet configured to exhaust the oxygen removed by the second hollow fiber membrane from the air separation module;
    a nitrogen-enriched air outlet configured to supply a stream of nitrogen-enriched air to a fuel tank of an aircraft; and
    a series of flow control valves positioned between the inlet and the first hollow fiber membrane and between the first hollow fiber membrane and the second hollow fiber membrane to divert supply air directly to the second hollow fiber membrane while the aircraft is in flight.

2. The air separation module of claim 1, wherein the supply air is bleed air.

3. The air separation module of claim 1, wherein the first hollow fiber membrane is removable from the air separation module.

4. The air separation module of claim 1, wherein the first hollow fiber membrane comprises a first membrane material and the second hollow fiber membrane comprises a second membrane material different from the first membrane material.

5. The air separation module of claim 4, wherein the first membrane material comprises polysulfone and the second membrane material comprises polyimide.

6. The air separation module of claim 1, wherein the first hollow fiber membrane and the second hollow fiber membrane comprise a single type of membrane material.

7. The air separation module of claim 6, wherein the single type of membrane material comprises polyimide.

8. The air separation module of claim 1, and further comprising a plurality of flow lines configured to direct supply air through the first hollow fiber membrane and the second hollow fiber membrane in parallel when demand for nitrogen-enriched air is high.

9. The air separation module of claim 1, wherein the first hollow fiber membrane is housed in a first canister and the second hollow fiber membrane is housed in a second canister.

10. The air separation module of claim 1, wherein the first hollow fiber membrane and the second hollow fiber membrane are housed in a single canister.

11. The air separation module of claim 1, and further comprising a flow control valve disposed between the first and second hollow fiber membranes and the fuel tank.

12. A method of generating nitrogen-enriched air, the method comprising:
    providing supply air to an inlet of a membrane-based air separation module;
    flowing the supply air through a first hollow fiber membrane to substantially remove water from the supply air;
    exhausting water removed by the first hollow fiber membrane from the air separation module;
    flowing the supply air through a second hollow fiber membrane to substantially remove oxygen from the supply air;
    exhausting oxygen removed by the second hollow fiber membrane from the air separation module;
    supplying a stream of nitrogen-enriched air produced by the air separation module to a fuel tank of an aircraft; and
    directing supply air through the first hollow fiber membrane and the second hollow fiber membrane in parallel when demand for nitrogen-enriched air is high.

13. The method of claim 12, and further comprising cooling bleed air to condition the supply air.

14. The method of claim 12, wherein the first hollow fiber membrane comprises a first membrane material and the second hollow fiber membrane comprises a second membrane material different from the first membrane material.

15. The method of claim 12, wherein the first hollow fiber membrane and the second hollow fiber membrane comprise a single type of membrane material.

16. The method of claim 12, and further comprising housing the first hollow fiber membrane in a first canister and the second hollow fiber membrane in a second canister.

17. The method of claim 12, and further comprising housing the first hollow fiber membrane and the second hollow fiber membrane in a single canister.

18. A method of generating nitrogen-enriched air, the method comprising:
    providing supply air to an inlet of a membrane-based air separation module;

flowing the supply air through a first hollow fiber membrane to substantially remove water from the supply air;

exhausting water removed by the first hollow fiber membrane from the air separation module;

flowing the supply air through a second hollow fiber membrane to substantially remove oxygen from the supply air;

exhausting oxygen removed by the second hollow fiber membrane from the air separation module;

supplying a stream of nitrogen-enriched air produced by the air separation module to a fuel tank of an aircraft; and diverting supply air directly to the second hollow fiber membrane while the aircraft is in flight.

* * * * *